United States Patent [19]

Toriumi et al.

[11] 4,049,341
[45] Sept. 20, 1977

[54] FILM CARRIER FOR MICROFILM READER

[75] Inventors: Shiro Toriumi, Machida; Seiichi Yamagishi, Tokyo, both of Japan

[73] Assignee: Minolta Camera Kabushiki Kaisha, Osaka, Japan

[21] Appl. No.: 677,654

[22] Filed: Apr. 16, 1976

[30] Foreign Application Priority Data

Apr. 23, 1975 Japan .................................. 50-56224

[51] Int. Cl.² .......................... G03B 1/48; G03B 21/14
[52] U.S. Cl. .................................... 353/23; 353/27 R; 353/95
[58] Field of Search ..................... 353/23, 27 R, 27 A, 353/95

[56] References Cited
U.S. PATENT DOCUMENTS 3,790,266  2/1974  Ueda et al. .............................. 353/95
3,967,890  7/1976  Wells ................................. 353/27 A Primary Examiner—Steven L. Stephan
Attorney, Agent, or Firm—Wolder & Gross

[57] ABSTRACT

A film carrier device for a microfilm reader includes a rectangular transparent flat base plate having a pair of laterally spaced parallel longitudinally extending guide members located along opposite side top borders of the base plate. The rear inside faces of the guide members diverge rearwardly and have longitudinal grooves extending for the full lengths of their bottoms and the grooves may extend likewise for the full lengths of the guide member inside faces. A transparent cover plate is hinged along its forward edge to the forward border of the base plate and is swingable between a closed position overlying the base plate and a rearwardly upwardly inclined open position. A pair of laterally spaced film stops project upwardly from the base plate proximate its rear portions and a pair of leaf spring film engaging clips are disposed proximate the guide member front ends or proximate the film stops. Openings are formed in the cover plate to register with the stops and film clips when the cover plate is in closed position.

13 Claims, 5 Drawing Figures

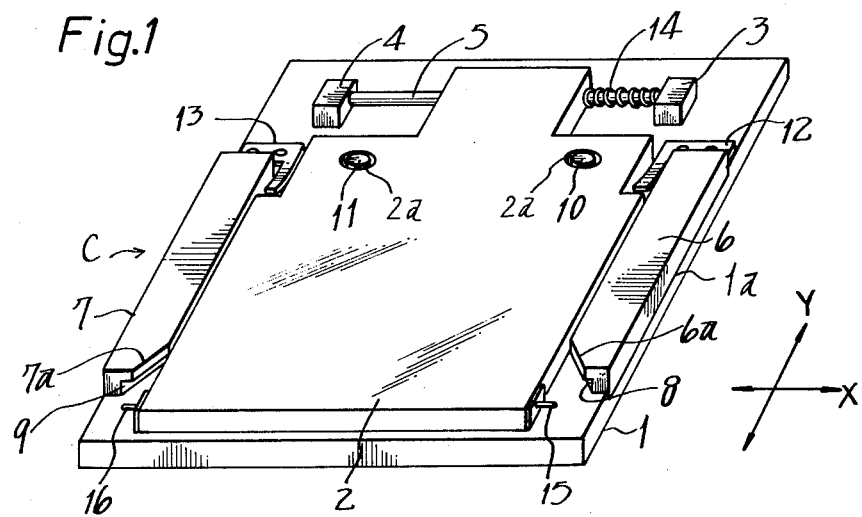
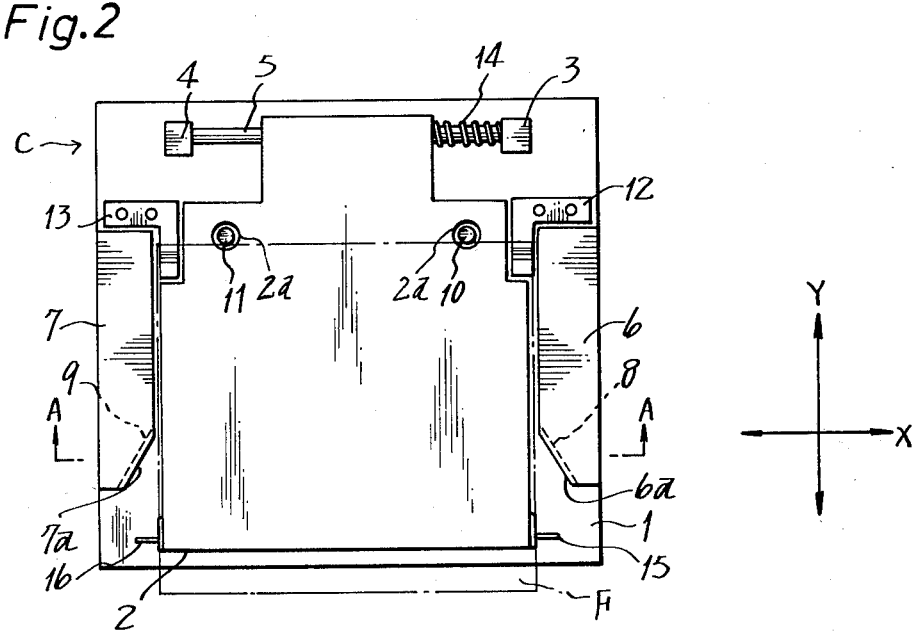
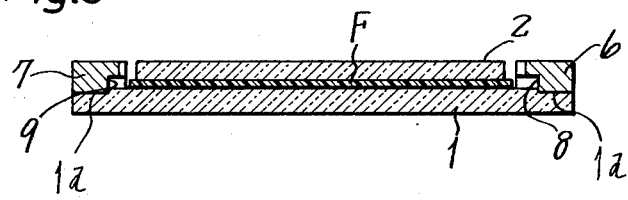

FILM CARRIER FOR MICROFILM READER

BACKGROUND OF THE INVENTION

The present invention relates generally to improvements in microfilm reader apparatus and it relates more particularly to an improved film carrier for microfilm readers, that is a device for a microfilm reader for firmly holding a microfilm sheet sandwiched between a base plate and a cover plate or holder which permits the automatic insertion, withdrawal and replacement of a microfilm sheet in the carrier.

The microfilm carriers heretofore available or proposed in microfilm readers possess numerous drawbacks and disadvantages. In their use in automatic film loading and withdrawing the following problems have been generally encountered.

If the microfilm curls, for one reason or another, particularly if it curls in such a manner that it may protrude from the sides of the film guides, it partly protrudes from the guides or the holder after it is inserted in the carrier device. Then when the carrier apparatus moves in the X-Y direction to select the desired frame, damage may occur to the microfilm itself or to the detecting or selecting mechanism. Besides, since the microfilm is not inserted properly, if the detecting means is operated, the frame may not be accuratelyselected.

Further, in the microfilm inserting position, the distance between the contact of a pair of feed rollers and a pair of film stops on the base plate of the carrier apparatus is made shorter than the length of the microfilm in the feeding direction. Consequently, the microfilm curls a little when it engages the stops upon its insertion; when the carrier apparatus withdraws from the rollers in this condition, the microfilm may be separated from the stops by reason of its elasticity; and even if the required frame is detected, it may be dislocated from its normal position and a defective image may be projected.

In a carrier apparatus for a microfilm reader which is designed to automatically detect and select a frame, it is difficult to completely eliminate the unsteadiness of the rotary axis of the holder or cover plate in the axial direction. Therefore, difficulty occurs in that the said holder slips during the selecting or detecting action, and the microfilm is accordingly dislocated from its normal position. Moreover, the film guide members on the base plate are usually bonded to the base plate itself. If, however, their bonded condition is imperfect, it may happen that the microfilm is not inserted as required because it will be nipped or wedged between the guide members and the base plate.

SUMMARY OF THE INVENTION

It is a principal object of the present invention to provide an improved film carrier device for a microfilm reader.

Another object of the present invention is to provide an improved film carrier device for a microfilm reader in which the carrier is automatically loaded and unloaded with film.

Still another object of the present invention is to provide an improved film carrier device for microfilm readers of the type in which the film is replaceably sandwiched between mutually hinged base and cover plates, the base or bottom plate being provided with film side guides and end stops.

A further object of the present invention is to provide an improved film carrier device for microfilm readers in which the film is firmly, accurately, replaceably retained in a predetermined position within very close tolerances.

Still a further object of the present invention is to provide a device of the above nature characterized by its high reliability, ruggedness, simplicity and great versatility and adaptability.

The above and other objects of the present invention will become apparent from a reading of the following description taken in conjunction with the accompanying drawings which illustrate preferred embodiments thereof.

In a sense the present invention contemplates the provision of a film carrier device comprising a base plate, a pair of laterally spaced substantially parallel guide members located in said base plate and having rearwardly diverging confronting faces at the rear thereof, the bottom portions of said diverging faces having formed therein longitudinal grooves extending the lengths of said diverging faces, and a transparent cover plate hinged along its forward border to the forward border of said base plate and swingable between a closed position superimposed on the top face of said base plate between said guide members and an open position extending above said base plate.

In the preferred form of the improved carrier device a pair of laterally spaced stops project upwardly from the base plate at the forward portion thereof, and a pair of leaf spring film clips are located proximate the stops or proximate the forward ends of the guide members, ad releasably engage the forward border of a fully inserted film unit. Openings are provided in the cover plate which register with the film stops and film clips when the cover plate is in the closed position. The cover plate is laterally spring biased at its swinging axis to stabilize the cover plate. The parallel confronting faces of the guide members may have grooves along the lengths of their bottoms which grooves are extensions of the grooves in the diverging faces. The bottoms of the guide members are advantageously nested in similarly shaped recesses in the side top borders of the baseplate.

The improved film carrier device overcomes the disadvantages and drawbacks of the earlier devices. Film units are easily and accurately automatically inserted and withdrawn from the carrier device, the inserted film unit is accurately and firmly positioned, curling and nipping of the film is eliminated, and displacement of the film in the carrier is prevented. The carrier device is rugged, reliable and of great versatility and adaptability.

BRIEF DESCRIPTION OF THE DRAWINGS.

FIG. 1 is a top perspective view of a film carrier device embodying the present invention;

FIG. 2 is a plan view thereof;

FIG. 3 is a sectional view taken along line A—A in FIG. 2;

DESCRIPTION OF THE PREFERRED EMBODIMENTS

Figure 4:
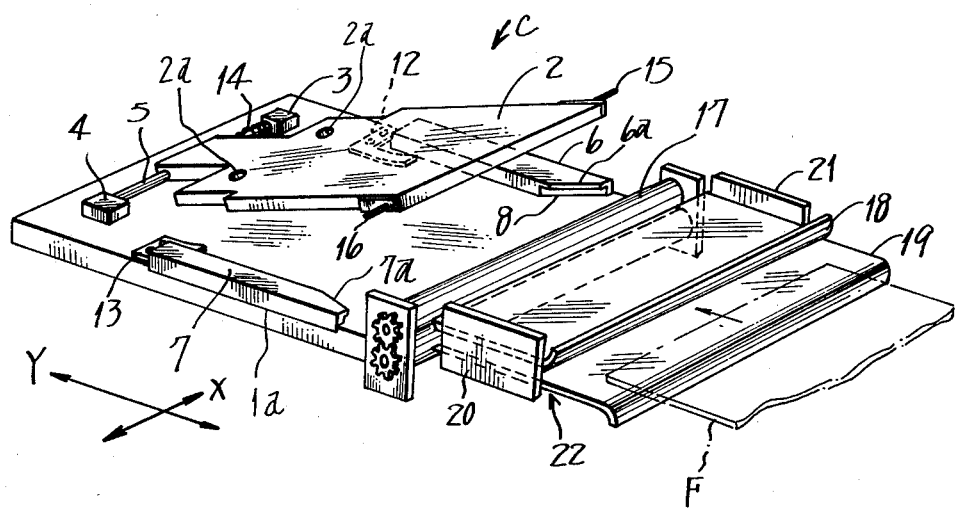
FIG. 4 is a perspective view illustrating the positioning of the carrier device relative to feed rollers which automatically insert and withdraw a microfilm from the device.

Referring now to the drawings, particularly FIGS. 1 to 4 thereof, which illustrate a preferred embodiment of the present invention, the reference numeral 1 generally designates a flat rectangular transparent base plate which is movable in the X—Y direction by a shifting mechanism, not shown. A pair of laterally spaced bearing blocks 3 and 4 are mounted atop the front border of base plate 1 and a lateral shaft 5 extends between and is rockably supported by and journalled in coaxial sockets in bearing blocks 3,4. Supported by shaft 5 for swinging between a closed position overlying base plate 1 and a upwardly rearwardly inclined open position is a transparent flat cover plate or holder 2 which maintains a microfilm sheet F in a flat retained position between the base plate 1 and closed cover plate 2. The cover plate 2 is resiliently laterally biased to a predetermined steady position by a helical spring 14 encircling shaft 5 and entrapped between bearing block 3 and cover plate 2. The base plate 1 need not necessarily be transparent but may be non-transparent depending upon the type of optical system employed.

Affixed atop the base plate 1 and extending along the side edges thereof are a pair of laterally spaced substantially parallel longitudinally extending guide members 6 and 7 whose bottom parts engage and nest in correspondingly shaped recesses 1a formed in the side borders of the top face of base plate 1. The inner rear or trailing edges 6a and 7a of guide members 6 and 7 diagonally rearwardly symmetrically diverge and have similarly rearwardly diverging grooves 8 and 9, respectively, formed in the bottoms thereof, the grooves 8 and 9 being delinated by the top face of base plate 1 and downwardly facing shoulders extending along trailing edges 6a and 7a. The grooves 8 and 9 serve, among other functions, to guide a microfilm sheet F into the area delineate by the confronting parallel faces of guide members 6 and 7 and prevent the defective insertion of the film sheet which may result in its curling, the guide members 6 and 7 functioning to accurately laterally position the inserted film sheet F.

Located in the base plate 1 rearward of the shaft 5 are a pair of laterally spaced film stop defining vertical projections 10 and 11 which function to position or index the front edge of an inserted film sheet F. A pair of laterally spaced openings 2a are formed in the cover plate 2 and these separably engage the stops 10 and 11 when cover plate 2 is in its closed position.

A pair of film sheet engaging clip elements 12 and 13 are mounted on base plate 1 proximate the forward inside faces of guide members 6 and 7 and each includes a rearwardly upwardly inclined leaf spring resilient arm which extends along respective guide member inside faces. Thus, upon the insertion of a film sheet F the leading border of the film sheet F is resiliently engaged between the base plate 1 and the leaf spring arms under the influence of the springs to prevent inadvertent dislocation of the film sheet F in the carrier.

The holder or cover plate 2 further includes a pair of coaxial pins 15 and 16 projecting laterally outwardly from the rear corners of the cover plate 2. The pins 15 and 16 function to be engaged by a raising mechanism (not shown) when the improved carrier is moved to its microfilm insertion position thereby lifting the holder 2 to its raised or open position relative to base plate 1 to permit the reception of a microfilm sheet F.

Figure 5:
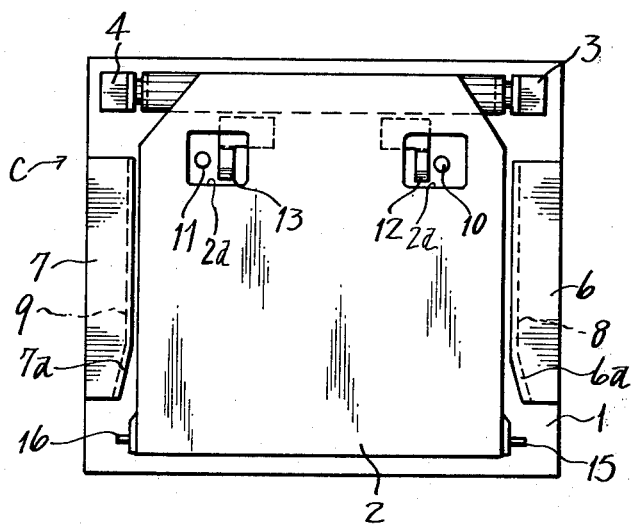
FIG. 5 is a top plan view of another embodiment of the present invention.

The improved carrier shown in FIGS. 1 to 4 may be modified in many ways such as by modifying the film sheet clip spring positions, the configuration of the guide members, and by other changes, for example, as shown in FIG. 5, which illustrates another embodiment of the present invention in which the same reference numeral designates corresponding parts.

Thus, as shown in FIG. 5, the leaf spring film clips 12 and 13 are disposed laterally inwardly and proximate the film positioning stops 10 and 11 with their leaf spring arms being upwardly rearwardly inclined. To releasably accommodate the stops 10 and 11 and spring clips 12 and 13 when cover plate 2 is in closed position, the openings 2a in cover plate 2 are enlarged and rectangular. Furthermore, the grooves 8 and 9 in the guide member diagonal trailing inside faces 6a and 7a are prolonged to extend for the full lengths of the guide member inside faces and and this further promotes the accurate positioning of the inserted film sheet. In all other respects the construction of the carriers illustrated in FIGS. 1 to 4 and FIG. 5 are similar.

It should be noted that the guide members 6 and 7 are nested in recesses 1a to prevent the wedging or entering of the film sheet between the base plate 1 and the underfaces of the guide members 6 and 7. This expedient may be obviated if the guide members 6 and 7 are bonded to the base plate 1 so that there is no space between the base plate 1 and the guide member underfaces or if the guide members and base plate are integrally formed.

In operation, a suitable shifting mechanism properly slides the carrier device C which comprises the cover plate or holder and the base plate in the X—Y directions on the carrier shifting surface of the microfilm reader which is not illustrated herein. At a predetermined position, the carrier device C advances toward feed rollers 17 in the Y direction for insertion of microfilm. On the way, pins 15 and 16 are lifted by a holder lifting mechanism which is not illustrated. Thereby the holder 2 is opened or lifted from the base plate 1 as illustrated in FIG. 4, and the carrier device C comes to a halt. In this condition, a microfilm F is properly fed to feed rollers 17 by way of a guide device 22 which consists of an upper guide plate 18, a lower guide plate 19, and side guide plates 20 and 21. On this occasion, when the passage of microfilm F is detected by a film detecting means (not shown) in guide device 22, the feed rollers 17 begin rotation to feed the microfilm F toward the carrier device C. Microfilm F is inserted between the base plate 1 and the holder 2 with is sidewise position controlled by guide members 6 and 7. That is, even if microfilm F is in a curling condition, it doesnot protrude from the base plate 1 due to the action of the grooves 8 and 9 of guide members 6 and 7. In other words, even if the microfilm is curled or fed obliquely the grooves 8, 9 together with the slant notches 6a and 7a correctly guide the microfilm as the sides thereof are fed along the grooves in engagement therewith. In addition, since the guide members 6 and 7 are bounded to or nested in sunken areas 1a of base plate 1, microfilm F can be inserted securely and safely without being nipped between guide members 6 and 7, and base plate 1.

When the microfilm F reaches film stops 10 and 11 it becomes somewhat curved to form a bump or ridge, because the distance between the feed rollers 17 on the one hand and film stops 10 and 11 on the other is a little less than the length of microfilm F. If the carrier device C begins movement to depart from feed rollers 17, microfilm F will, as mentioned before, be dislocated from its normal position by reason of the influence of its own elasticity. However, such a problem is overcome by the improved carrier device C of the present invention, because it is provided with clip leaf springs 12 and 13 which are designed to engage or press the leading edge of microfilm F.

With the insertion of microfilm F completed, as above, the carrier device C departs from the feed rollers 17 and moves in the X—Y directions according to instructions from suitable machine associated detecting means. Pins 15 and 16 become disengaged from the holder lifting means when the carrier device C departs from feed rollers 17.

Then, under its own weight, holder 2 presses microfilm F to base plate 1 so that microfilm F may be kept flat and its dislocation is thus prevented. On this occasion, any unsteadiness of the holder 2 can be eliminated and the dislocation of microfilm F can be prevented more securely, because coil spring 14 which is set around rotary axis 5 of holder 2 forces bearing 3 and holder 2 to constantly repulse each other in the axial direction.

While there have been described and illustrated preferred embodiments of the present invention, it is apparent that numerous alterations, omissions and additions may be made without departing from the spirit thereof.

We claim:

1. A carrier device for a microfilm reader comprising: a base plate for receiving thereon a microfilm, said base plate having a forward border a transparent holding plate having a forward end and being pivoted for swinging about a transverse axis proximate its forward end to the forward border of said base plate, for holding the microfilm tight on the base plate when said holding plate is in closed substantially superimposed position relative to said base plate, said base plate and said holding plate being movable as a unit in a planewise direction, a pair of guide members fixed on both sides of the base plate and each having a slant notch and a groove running diagonally forwardly inwardly to converge in the direction of movement of the microfilm insertion, said groove running parallel with said slant notch and formed along the bottom of said slant notch, said guide members controlling the sidewise positioning of the microfilm on the base plate upon insertion of the microfilm fed between said base plate and said holding plate.

2. A carrier device for a microfilm reader as recited in claim 1, further comprising a pair of plate spring means fixed on the base plate for nipping and holding the leading edge of the inserted microfilm, said spring means having rearwardly directed portions bent upwardly.

3. A carrier device for a microfilm reader as recited in claim 1, further comprising a coil spring means placed around the axis of said pivoted holding plate and resiliently acting in the axial direction to urge the holding plate toward a bearing fixed on the base plate.

4. A carrier apparatus for a microfilm reader as recited in claim 1, wherein said base plate is formed with sunken area corresponding to the shape of said guide members for receiving the bottoms of said guide members therein.

5. A film carrier for a microfilm reader comprising a base plate, a pair of laterally spaced longitudinally extending guide members located on said base plate and having rearwardly diverging inner rear faces having formed along their bottom borders longitudinal grooves extending along the lengths of said inner rear faces and a transparent cover plate supported proximate the front borders of said base plate and cover plate for swinging about a lateral axis between a closed position overlying said base plate between said guide members and an open position above said base plate.

6. The film carrier of claim 5 including a film stop member projecting upwardly from said base plate inwardly of said lateral axis and between said guide members.

7. The film carrier of claim 6 comprising a pair of laterally spaced film clip members in lateral alignment with said stop member and located on said base plate, each of said clip members including a rearwardly upwardly inclined leaf spring arm adapted to engage between said arm and said base plate the front border of an inserted film unit.

8. The film carrier of claim 7 wherein said cover plate has formed therein recesses registering with said stop and clip members when said cover plate is in closed position.

9. The film carrier of claim 5 wherein the confronting inside faces of said guide members forward of said diverging faces are substantially parallel.

10. The film carrier of claim 9 wherein said guide member confronting faces have formed along their bottoms longitudinal grooves extending from said grooves in said diverging faces.

11. The film carrier of claim 5 wherein said grooves are each delineated by the top face of said base plate and the underface of a shoulder located on the respective guide member diverging face and disposed above said base plate.

12. The film carrier of claim 5 including spring means engaging and resiliently laterally loading said cover plate proximate said lateral axis to laterally stabilize said cover plate.

13. A carrier device for a microfilm reader comprising:
a base plate for receiving thereon a microfilm for movement in a planewise direction;
a pair of guide members fixed on both sides of the base plate and each having a slant notch and a groove running diagonally inwardly in the direction of the microfilm insertion, said groove running parallel with said slant notch and formed along the bottom of said slant notch, said guide members controlling the sidewise position of the microfilm on the base plate upon insertion of the microfilm fed to said base plate.

* * * * *